United States Patent [19]

Nordstrand et al.

[11] Patent Number: 5,487,071
[45] Date of Patent: Jan. 23, 1996

[54] RADIO LINK FAILURE

[75] Inventors: Ingrid V. Nordstrand, Sundbyberg;
Stig R. Bodin, Spånga, both of Sweden

[73] Assignee: Telefonaktiebolaget LM Ericsson, Stockholm, Sweden

[21] Appl. No.: 129,095

[22] PCT Filed: Feb. 3, 1993

[86] PCT No.: PCT/SE93/00085

§ 371 Date: Oct. 5, 1993

§ 102(e) Date: Oct. 5, 1993

[87] PCT Pub. No.: WO93/16562

PCT Pub. Date: Aug. 19, 1993

[30] Foreign Application Priority Data

Feb. 5, 1992 [SE] Sweden .................................. 9200336

[51] Int. Cl.$^6$ ....................................................... H04J 3/14
[52] U.S. Cl. .............................. 370/110.1; 455/68; 370/14
[58] Field of Search ................................... 370/95.3, 95.1, 370/95.2, 94.1, 94.2, 93, 92, 60, 13, 17, 110.1, 110.4, 111, 14; 455/33.1, 33.2, 33.3, 33.4, 67.1, 54.1, 67.3, 67.7, 68; 379/59, 60, 63

[56] References Cited

FOREIGN PATENT DOCUMENTS 310379  5/1989  European Pat. Off. .

OTHER PUBLICATIONS

GSM Recommendation 04.08, v. 3.8.0, p. 55, section 3.5.2.

Primary Examiner—Melvin Marcelo
Assistant Examiner—Huy D. Vu
Attorney, Agent, or Firm—Burns, Doane, Swecker & Mathis

[57] ABSTRACT

A cellular mobile telephone system of the TDMA-type has a plurality of mobile radio units which are connected via radio channels with a communication network that includes radio base stations. Monitoring and signalling between the base stations and the mobile radio units is effected with at least one signal flow, among other things responsible for maintaining the physical connection. A second signal flow is used that is responsible, among other things, for transmitting certain data (such as Short Message Service SMS) which is not concerned with maintaining the connection. Considering the first and second signal flows on the data link level (level 2), devices provided for aborting the physical connection are activated when devices monitoring the first and second signal flows indicate a broken connection based on the first signal flow, not on the second signal flow.

1 Claim, 7 Drawing Sheets

RADIO LINK FAILURE

TECHNICAL FIELD

The present invention relates to an improvement in a cellular TDMA (time division multiple access) mobile telephone system which uses multi-layer protocol in accordance with the so-called OSI-model for the transmission of information.

BACKGROUND

Figure 1A:
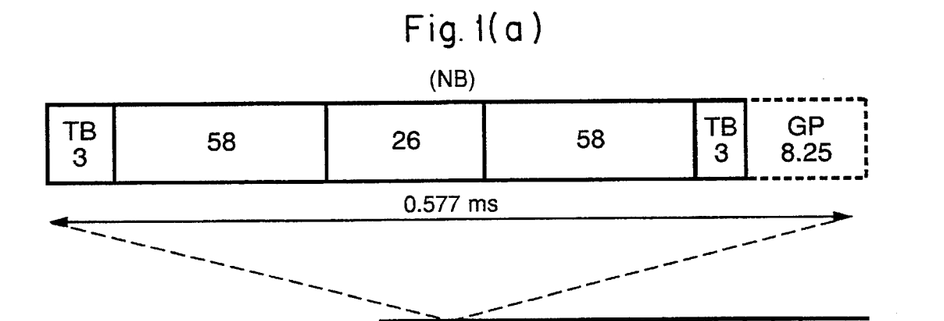
FIG. 1a–1c illustrates a normal burst (a), a TDMA frame (b) and the multi-frame of a traffic channel (c), as they occur in the GSM-system.
Figure 1B:
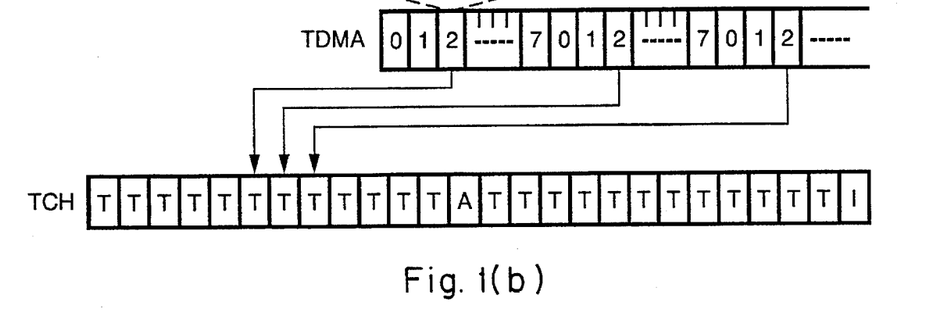
Figure 1C:
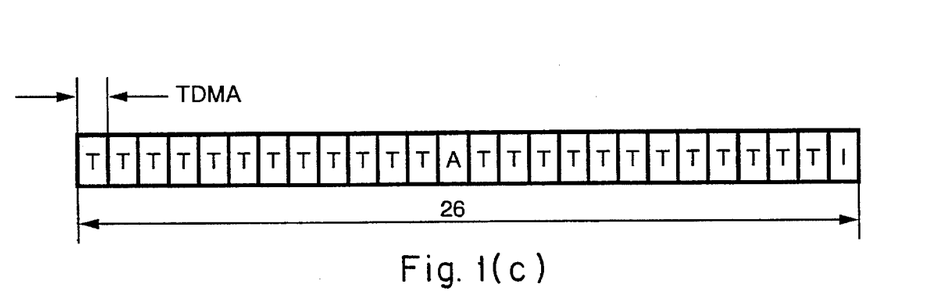

In the European cellular mobile telephone system GSM, all traffic and signalling is transmitted digitally and in accordance with the TDMA method. Signalling and traffic information are both transmitted in radio channels between base stations (BTS) and mobile stations (MS) in the form of bursts (NB) which include, for instance, 156.25 bits, as illustrated in FIG. 1a. A burst (NB) is begun with three start bits (TB) which are followed sequentially by 58 message bits (encrypted), 26 bits included in a training sequence, 58 new message bits (encrypted) and three stop bits (TB). A guard space (GP) corresponding to 8.25 bits is provided between two mutually sequential bursts. A burst will therefore have a total length of 156.25 bits, corresponding to a time period of 0.577 ms. Bursts from different channels are placed sequentially on a radio channel frequency where they form TDMA frames each of 8 bursts, as illustrated in FIG. 1b. Mutually sequential frames in one and the same time slot, e.g. time slot 2, form a channel, for instance a traffic channel (TCH). These bursts contain, for instance, speech information in a digital compressed form, although one burst among 26 bursts in a channel is reserved for a control channel SACCH (slow access control channel) and has been referenced A in FIG. 1c.

Figure 2:
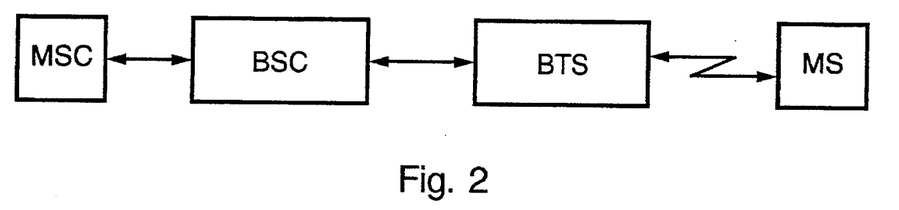
FIG. 2 illustrates a hardware configuration pertinent to the invention.

As illustrated in FIG. 2, the transmission of information in accordance with the above description can take place either solely between MS (mobile station) and BTS (base station), for instance when transmitting speech information which is coded/decoded in MS and BTS, or may take place between MS and MSC (mobile services centre), via BTS and BSC (base station controller), for instance when concerned with certain signalling.

Figure 3:
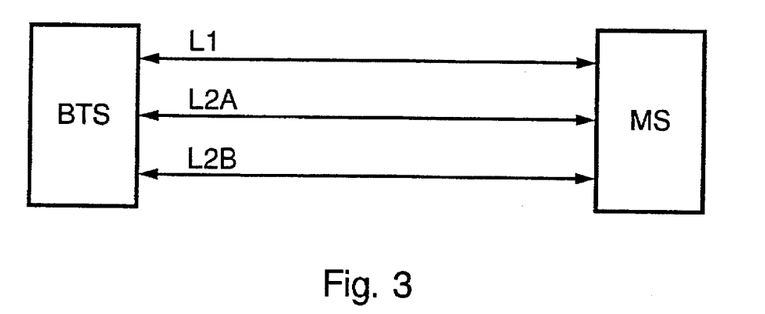
FIG. 3 illustrates radio link protocols (L1, L2A, L2B) pertinent to the invention.

The protocols contain elements which concern the release of a connection, more specifically a connection release which does not take place when communication is terminated but which occurs as a result of abortion due to poor connection quality or some other abnormal situation and which is monitored on the physical layer or on the data link layer, which is the layer directly above the physical layer as specified in the OSI model. Those layers in the GSM-system which are concerned with this problem are shown in FIG. 3 and have been referenced L1, L2A, L2B. These layers concern the transmission of the physical channel (protocol L1), and also the signalling used for example for establishing and handing over traffic channels (protocol L2A), and also for signalling and information transmission of short message services SMS (protocol L2B).

In the present system (GSM, January 1992), a failure on layer L1, L2A and L2B will cause the physical connection to be aborted. This takes place in the mobile by shutting down the transmitter, and in the base station, either by ordered release of the connection, which therewith guarantees that MS is also released, or by shutting down the transmitter. See FIG. 5. We assume that a traffic channel TCH has been established. The criterion for a failure existing on layer L1 is a fault indication from a leaky bucket counter, which is set to a given value and which counts down one step for each received faulty SACCH (slow access control channel) frame, and which counts up two steps for each correct received SACCH frame (see FIG. 5A). The criterion for a failure existing on layer L2A is missing acknowledgement for FACCH (fast access control channel) for a determined number of times, e.g. 34 times. The criterion for a failure to exist on layer L2B is the non-appearance of an acknowledgement on SACCH (slow access control channel) for SMS (short message service) for a given number of times, e.g. 5 times (see FIG. 5B). As before mentioned, a failure on any of the layers L1, L2A, L2B will thus result in an abortion of the physical connection, i.e. the connection is forcibly released.

Figure 5:
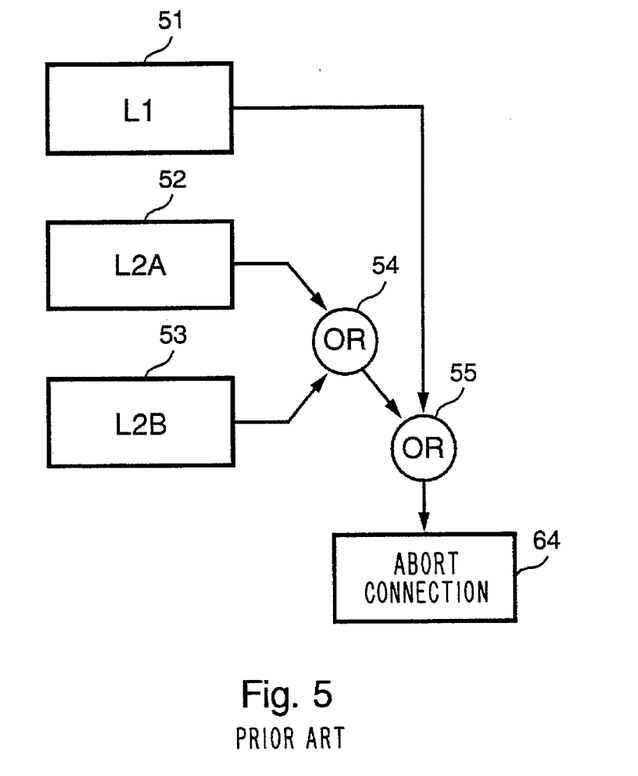
FIG. 5 is a block diagram which illustrates the abortion of a connection in the event of a failure, in accordance with the procedures in the present-day GSM system (January 1992).
Figure 5A:
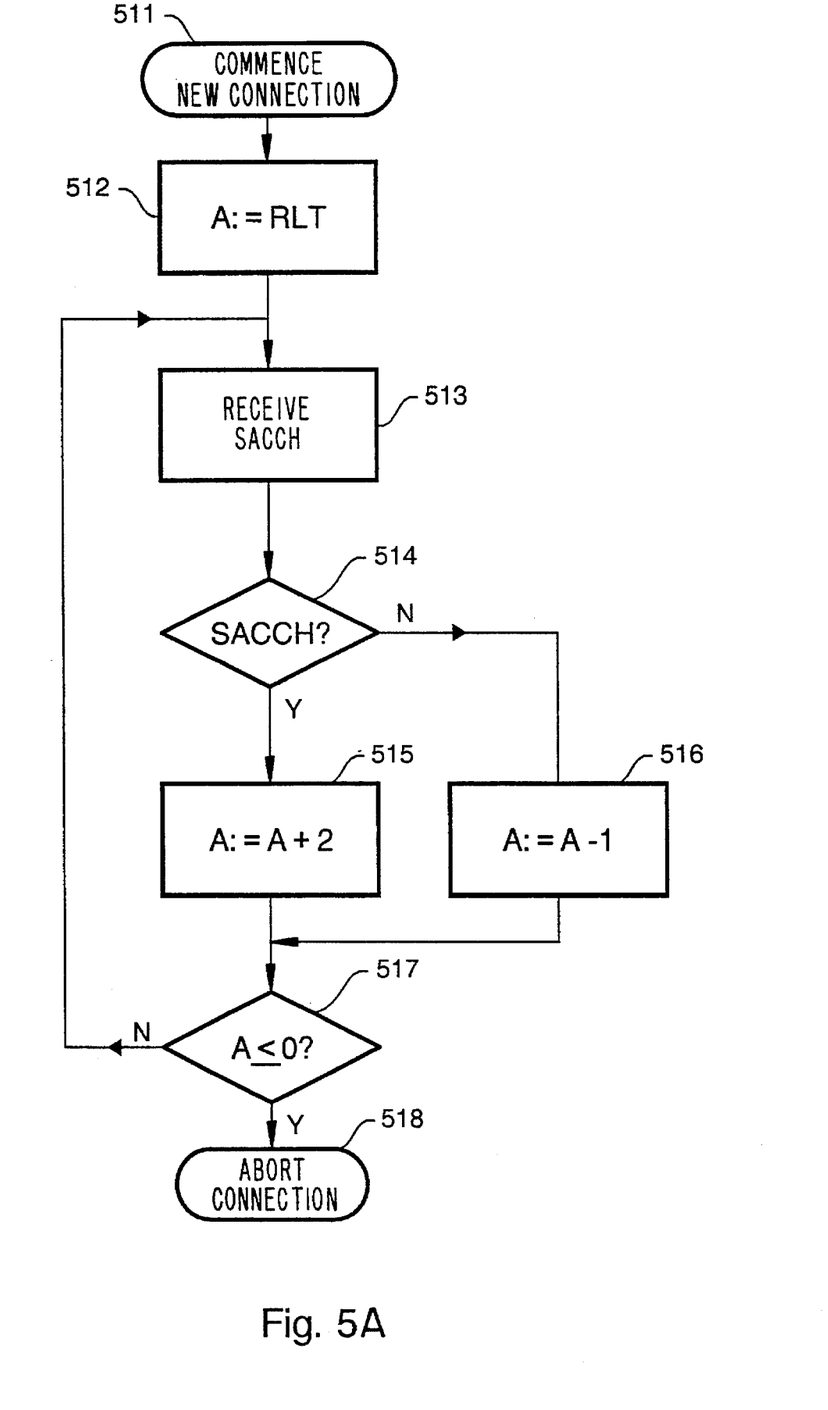
FIG. 5A shows a flow diagram for the abort sequence in the physical layer (L1)

FIG. 5A illustrates more in detail how monitoring of the physical layer L1 is effected while using a "leaky bucket" counter. When a new connection is commenced, either by connecting a new call or handover (step 511), the variable A is set to the value RLT (step 512). When SACCH is not received (step 513 and the No-output from stage 514), the variable A is stepped down one decrement step (in step 516). An investigation is then made (step 517) in order to ascertain whether the variable A has been stepped down to 0 or not. If the variable A has been stepped down, the connection is aborted (in step 518). If the investigation shows that the variable A has not been stepped down to 0 in step 517, the procedure is repeated from step 513. Each time SACCH is received correctly, a Yes-output from step 514, the variable A is stepped up two increments, which delays any possible abortion.

Figure 5B:
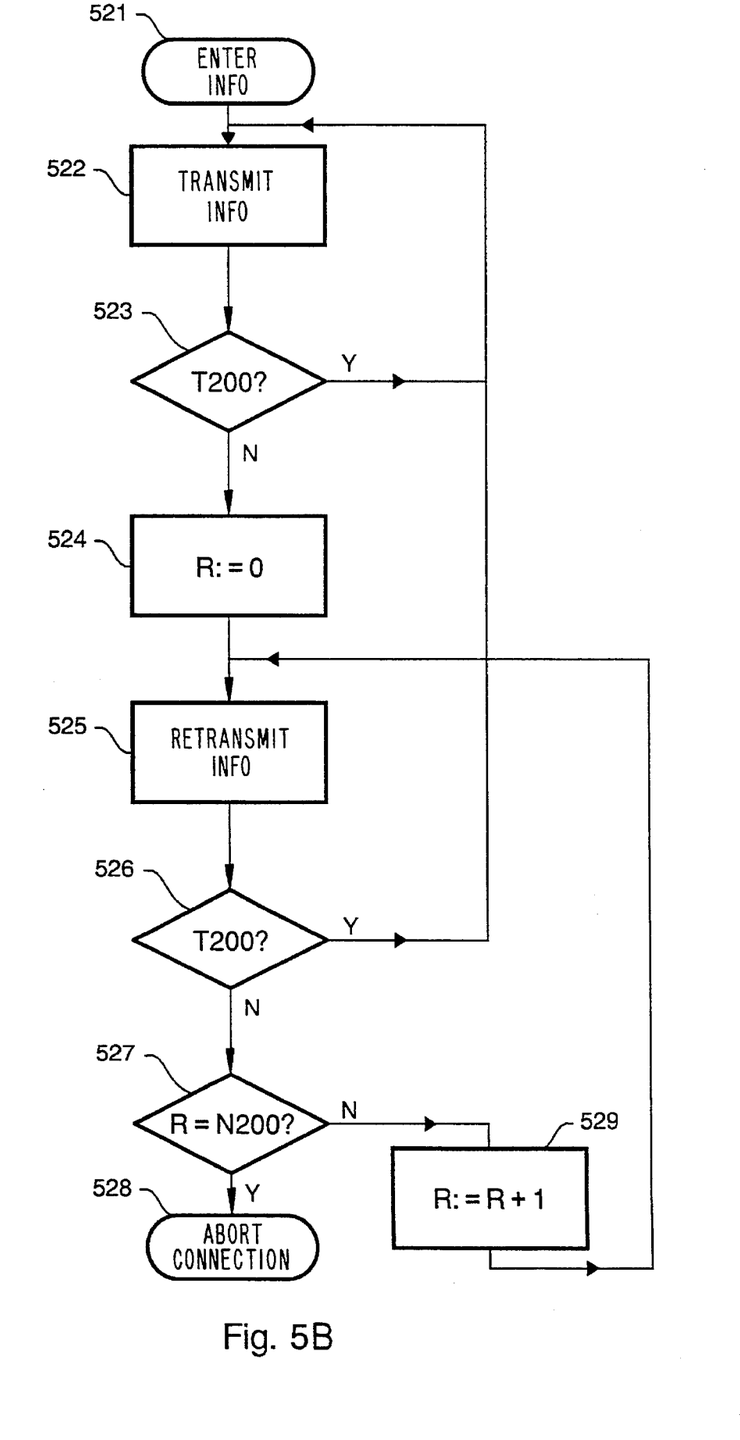
FIG. 5B shows a flow diagram for the abort sequence used in the data link layer (L2A and L2B)

FIG. 5B illustrates more in detail the process of monitoring on a data link layer, where the data links L2A and L2B are monitored. When information is received from higher layers, normally layer 3 (step 521), information is transmitted at a point in time which is determined by the protocol (step 522). A time monitoring process is started (step 523) and if no acknowledgement is received within a time period T200 (No-output), the variable R is set to zero or reset to zero in step 524, in order to prepare counting of a number of consecutive retransmissions lacking correct confirmation, the first of these transmissions being made in step 525.

If an acknowledgement is received within the prescribed time period T200 in step 523, the Yes-output is selected and the transmission of information continues. Receipt of an acknowledgement is again monitored in step 526 (compare step 523) and if no acknowledgement is received within a prescribed period of time (No-output), a test is run to ascertain whether or not the number of retransmissions has reached the maximum value N200 (step 527). When the answer is negative (No-output), R is stepped up one increment (step 529) and the next retransmission is carried out (step 525). When the answer in step 527 is positive, an abortion is ordered (step 528). It will be noted that the flow schematic is identical for the two links L2A and L2B, which are the links implemented at present on the data link layer (level 2), although the delay (T200) and the maximum value (N200) of R are different for the two links. Typical values for L2A are: T200≈170 ms, N200=34 and for L2B T200≈900 ms, N200=5 giving time out after 5.78 and 4.5 seconds, respectively.

A summary of the various monitoring processes:

L1: Referring to FIG. 5A, the function of the physical link is monitored, even when no information is transmitted, for instance when there is a long interruption in a conversation.

L2A: Referring to FIG. 5B, signalling is monitored, e.g. when establishing and releasing a connection and performing handover.

L2B: Referring to FIG. 5B, a conversation is monitored when it consists of short message transmission.

If the mobile station MS is used for speech transmission there is no supervision of the speech in the system. The subscriber interrupts the call when he considers the connection to be of poor quality.

If the mobile station is used for data transmission the transmitted data is supervised on higher layers than layer 2.

A description of the GSM system as implemented by Ericsson is found in "CME 20 Training Document" bearing the Ericsson designation EN/LZT 120226/2 R1A. Reference is made to the following section in the official GSM specification with regard to details that concern the present invention: 05.01/05.02 for a description of the physical layer; 05.08 for a description of monitoring of the physical layer (leaky bucket); 04.05/04.06 for a description of data link protocols (here referred to as L2A and L2B); 04.08, Chapter 3.5.2, for a description of the present abortion logic.

Figure 4:
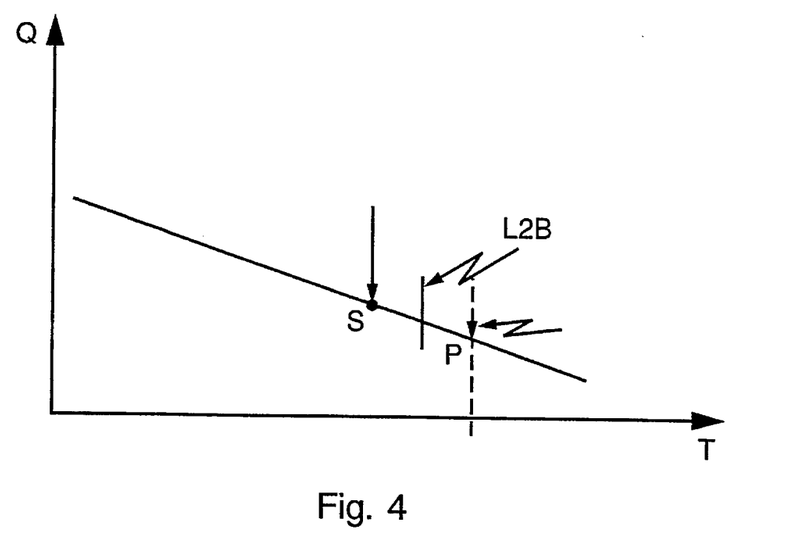
FIG. 4 shows how a handover of a traffic channel is interrupted by an abortion initiated by the protocol L2B.

The aforedescribed :interaction of protocols causing abortion is disadvantageous in some situations. FIG. 4 illustrates a first example in which a handover (HO) is in progress under the protocol L2A. The object of this handover is to improve the connection, but it is interrupted because no acknowledgement has been received after, e.g., five signalling attempts over the data link layer L2B resulting in abortion of the physical connection. FIG. 4 shows the signal quality Q as a function of time T. The word "quality" in FIG. 4 either means error quotient BER (bit error rate), or signal strength SS, or interference quotient C/I (carrier over interference). Shown on the negatively sloping curve is a point S at which a handover procedure is started, and a point P at which handover would have taken place if the connection had not been aborted at some point between S and P.

The blocks 51, 52 and 53 in FIG. 5 symbolize the monitoring on the physical layer L1, L2A and L2B respectively, wherein the outputs of the monitoring modules indicate the occurrence of a failure, i.e. a respective monitoring module for layer L1, L2A or L2B has diagnosed a failure. The circles 54 and 55 indicate Orfunctions and the block 64 shows that the associated connection is aborted when L1 or L2A or L2B indicate a fault.

Although not shown in the drawings, a second example is found in the case where L2B aborts the physical connection and therewith aborts data transmission in progress on the same connection. For instance, it is possible that the redundancy or repetition ability in the data transmission is greater than when signalling in protocol L2B and that the release therefore interferes with an ongoing, acceptable communication.

SUMMARY OF THE INVENTION

The invention is based on the the fact that we realize that connections in which the transmission quality is poor should be aborted in order to be able to reuse the resources in other connections, but that the connections should not be aborted when a connection is found to still function for any ongoing use and secondly, for as long as an attempt is being made to save the connection by handover or preparations therefor.

An object of the present invention is to provide a method of dealing with faults when signalling in cellular TDMA (time division multiple access) systems which use different layers of signalling of the type describe by the OSI system (the reference model of Open System Interconnection (OSI) given in CCITT recommendations X.200 and X.210) and which method fulfill the aims recited in the preceding paragraph.

A further object of the invention is considering the data link layer (layer 2), to provide a mobile system, i.e. base stations (BS), base station control units (BSC) mobile telephone switches (MSC) and mobile radio terminals (MS) which will abort a traffic connection only when the failure occurs in that protocol (L2A) which is associated with setting up and handing over the physical connection.

Figure 6:
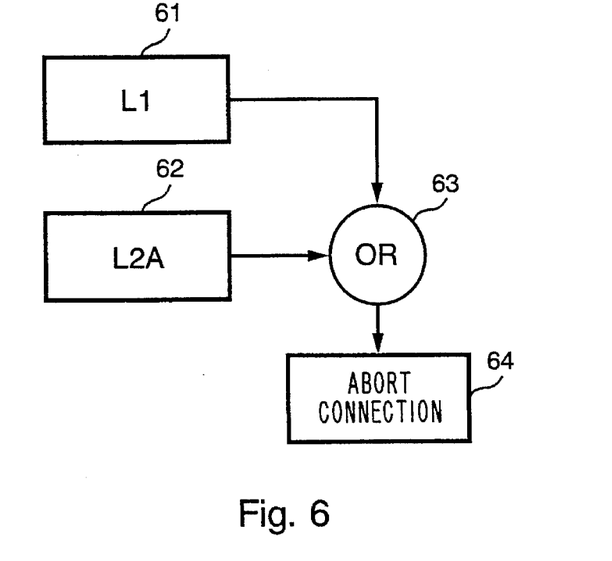
FIG. 6 is a block diagram which illustrates the release of a connection in the event of failure, in accordance with the present invention.

The invention relates to applying the disconnection flow illustrated in FIG. 6 instead of the known flow illustrated in FIG. 5. It will be noted that a disconnection can also be initiated by layers above the data link layer. However, the invention is concerned solely with the data link layer.

DETAILED DESCRIPTION

Figure 7:
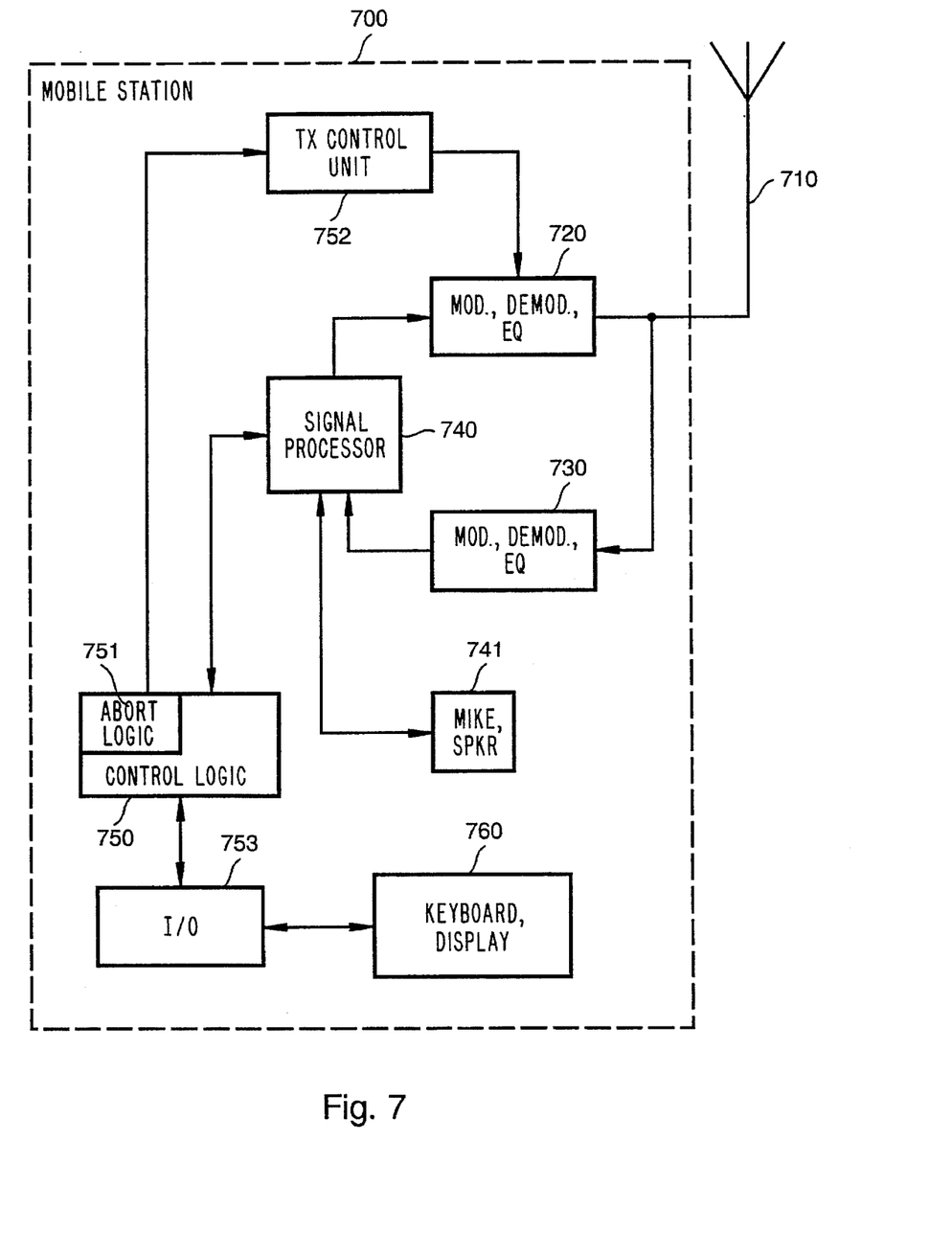
FIG. 7 is a block schematic-of a mobile station according to the present invention.
Figure 8:
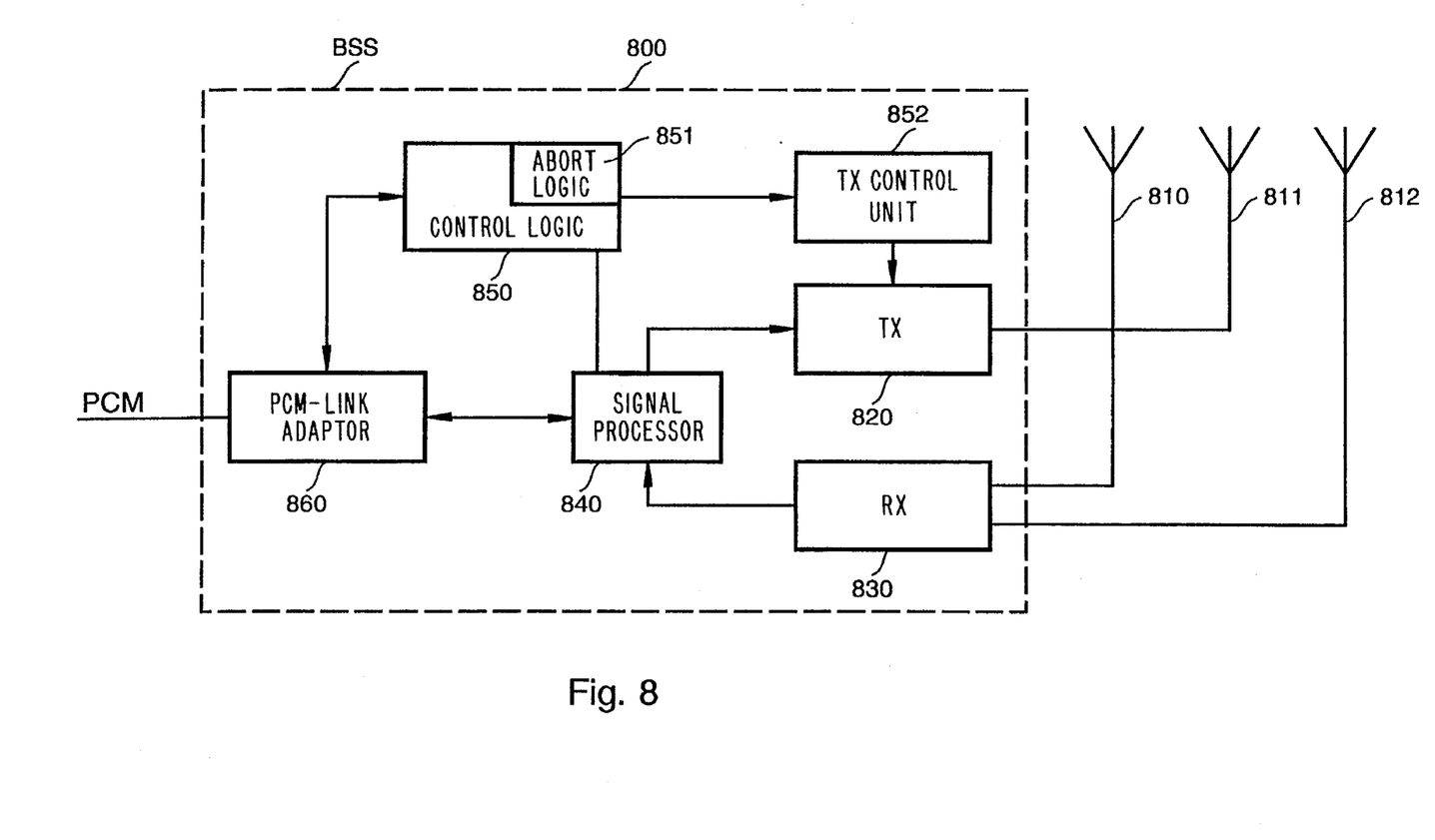
FIG. 8 is a function block schematic of base station system according to the present invention

FIGS. 1–5B relate to known art techniques and have been described above under background of the invention. FIGS. 6–8 which illustrate the present invention are described herebelow.

FIG. 6 is a flow diagram which illustrates the release of a connection in the event of failure, in accordance with the present invention. The release of a connection in the event of a failure is also referred to as abortion of a connection, in order to distinguish this form of release from the release of a connection that takes place when communication has been terminated normally. A connection is aborted when the connection is no longer usable so that the resources seized by this connection can be returned to a free state and therewith reused in conjunction with further connections. The blocks 61 and 62 shown in FIG. 6 represent respectively the monitoring modules for the layers L1 and L2A, the outputs of which symbolize that a failure has occurred, i.e. that the respective layers L1 and L2A have diagnosed a failure. The circle 63 represents an Or-function and block 64 shows that the associated connection is aborted when either one of the blocks 61 or 62 activates its output. The method illustrated in FIG. 6 means that an abortion is initiated either from the physical layer or from that transmission protocol on the data link layer which is related to maintaining the physical connection (establishment, handover, etc.) (L2A).

FIG. 7 is a block diagram of a mobile station according to the invention. The mobile station 700 has an antenna 710. A transmitter 720 is connected to the antenna 710 and is controlled by a transmitter control unit 752 which, among other things, is able to effect the aborting switching off of the transmitter. The transmitter is also connected to a signal processing unit 740. A receiver 730 is also connected to the antenna and is used in time multiplex together with the transmitter. The receiver 730 is also connected to the signal processing unit 740. Radio equipment for modulating, demodulating and equalizing purposes is included in the blocks 720 and 730. The signal processing unit 740 includes facilities for channel coding, channel decoding and signal processing of incoming and outgoing speech. The signal processing unit 740 is also connected to a microphone and speaker in block 741, and to control logic 750. In turn, the control logic 750 is connected to the transmitter control unit 752 and to I/O-block 753 which adapts the signals from a keyboard and to a display window in block 760.

The invention is implemented in the form of data or in the form of a program sequence in the control logic 750, and has been designated 751, "abortion logic". The control logic monitors the physical layer L1 with the aid of a programmed "leaky bucket" counter, which is well known in telecommunication systems and the operation of which is shown in FIG. 5A. The logic also monitors that transmission which, among other things, concerns the establishment of a connection and the handover of connections (L2A) as described in FIG. 5B. When either L1 or L2A requires the abortion of a connection, block 751 orders block 752 to effect this abortion.

FIG. 8 is a block diagram illustrating a base station system. The invention can be implemented as a base station with the block diagram according to FIG. 8. The hardware shown in the FIG. 8 diagram, however, may also be distributed over several units, for instance over a base station BTS and a base station controller BCS. In order to cover both instances, the function block diagram in FIG. 8 has been called base station system BSS. BSS block 800 has three antennas, of which two, 810 and 812, are used for receiving signals, whereas only one antenna 811, is used to transmit signals. A transmitter 820 is connected to the antenna 811 and is controlled by a transmitter control unit 852 which, among other things, is able to effect the aborting or forced-release of the transmitter. The transmitter is also connected to the signal processing unit 840. A receiver 830 is connected to the antennas 810 and 812. The receiver 830 is also connected to the signal processing unit 840. Radio equipment for modulating and demodulating and equalizing purposes is included in the blocks 820 and 830. The signal processor unit 840 includes means for channel coding and decoding and processing speech in the incoming and outgoing directions. The signal processor unit 840 is also connected to the PCM-link adaptor block 860 and to the control logic 850. In turn, the control logic 850 is connected to the transmitter control unit 852. The invention is realized in the form of data or a program sequence in the control logic 850, and has been referenced 851, "abortion logic". The control logic monitors the physical layer L1 with the aid of a programmed "leaky bucket" counter, which is well known in telecommunication techniques, and the logic monitors that transmission which, among other things, relates to the establishment of a connection and the handover of connections (L2A). When either L1 or L2A requires a abortion, the block 851 orders the block 852 to effect such abortion. The PCM-link adaptor block 860 is connected to the network through one or more PCM-lines.

What is claimed is:

1. A cellular mobile telephone system using TDMA-type signalling structured in layers described by an OSI model, comprising a plurality of mobile radio units which are connected with a communication network via radio channels, the communication network including radio base stations, wherein signalling between the mobile radio units and the network is effected on a data link layer with at least one first signal flow responsible for maintaining a physical connection, and a second signal flow responsible tier transmitting data which is not concerned with maintaining said physical connection, and wherein at least one of the mobile radio units and the communication network include means for aborting the physical connection, and means for monitoring correct transmission of the first and second signal flows, wherein the aborting means are activated when the monitoring means indicate a broken connection based on the first signal flow and the aborting means are not activated when the monitoring means indicate a broken connection based on the second signal flow.

\* \* \* \* \*